United States Patent
Fayolle et al.

(10) Patent No.: US 12,265,035 B2
(45) Date of Patent: Apr. 1, 2025

(54) METHOD FOR DETECTING DEFECTS OF THE HORIZONTAL MOLD SEAL FOR GLASS CONTAINERS

(71) Applicant: TIAMA, Saint-Genis-Laval (FR)

(72) Inventors: Lubin Fayolle, Brignais (FR); Julien Fouilloux, Lyons (FR)

(73) Assignee: TIAMIA, Saint-Genis-Laval (FR)

( * ) Notice: Subject to any disclaimer, the term of this patent is extended or adjusted under 35 U.S.C. 154(b) by 104 days.

(21) Appl. No.: 18/265,004

(22) PCT Filed: Dec. 9, 2021

(86) PCT No.: PCT/FR2021/052261
§ 371 (c)(1),
(2) Date: Jun. 2, 2023

(87) PCT Pub. No.: WO2022/136761
PCT Pub. Date: Jun. 30, 2022

(65) Prior Publication Data
US 2024/0003823 A1    Jan. 4, 2024

(30) Foreign Application Priority Data
Dec. 22, 2020   (FR) ...................................... 2013948

(51) Int. Cl.
*G01N 21/90*   (2006.01)
*G01N 21/88*   (2006.01)

(52) U.S. Cl.
CPC ..... *G01N 21/9054* (2013.01); *G01N 21/8851* (2013.01); *G01N 2021/887* (2013.01); *G01N 2021/8887* (2013.01)

(58) Field of Classification Search
CPC ........... G01N 21/9054; G01N 21/8851; G01N 2021/887; G01N 2021/8887
See application file for complete search history.

(56) References Cited

U.S. PATENT DOCUMENTS 5,753,905 A     5/1998  Ringlien

FOREIGN PATENT DOCUMENTS

| WO | 2013/128538 | 9/2013 | |
| WO | WO-2013128538 A1 * | 9/2013 | ......... G01N 21/9054 |

\* cited by examiner

*Primary Examiner* — Jamil Ahmed
(74) *Attorney, Agent, or Firm* — Millen, White, Zelano & Branigan, P.C.; Christopher W. Brody

(57) ABSTRACT

A method for detecting, on the finish of containers, defects in a horizontal mold seal of the container includes the steps of disposing the container between a light source and a camera and ensuring the rotation of the container on itself according to one rotational revolution. The camera acquires, at each increment of rotation of the container, an image so that the number of images per rotational revolution is greater than 36. The images captured for each container are analyzed such that the profile of the finish edge is detected in each image, the profiles of the finish edge of the images are compared with a reference profile of the finish edge so as to detect deviations between these profiles, and a defect in the horizontal mold seal for a container is detected when at least one image of said container has a deviation.

24 Claims, 8 Drawing Sheets

METHOD FOR DETECTING DEFECTS OF THE HORIZONTAL MOLD SEAL FOR GLASS CONTAINERS

TECHNICAL FIELD

The present invention relates to the technical field of the inspection of objects, hollow articles or, in general, transparent or translucent containers such as, for example, bottles, jars or flasks made of glass.

The object of the invention more specifically relates to the field of inspection of such glass containers with a view to detecting, on the finish of such containers, the presence of defects for the horizontal mold seal.

PRIOR ART

Figure 1:
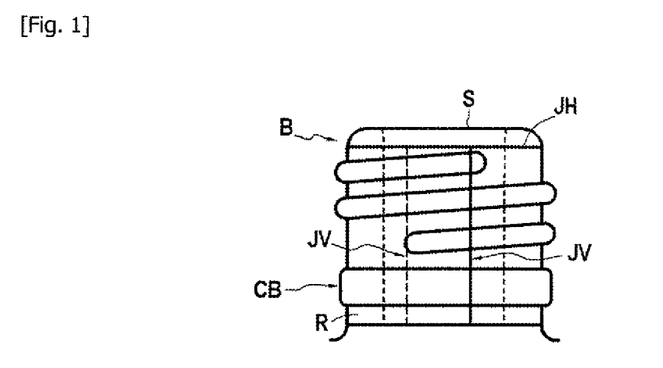
FIG. 1 is a large-scale view showing on the finish of a glass container, the horizontal mold seal and each vertical mold seal.

In general, a container has a bottom from which rises a vertical wall ending in a part called finish part. The finish is of different types depending on the provided closing system and includes, as illustrated in FIG. 1, at the top, the annular finish surface S and, at the bottom, a counter-finish CB. This FIG. 1 represents a screw-type finish, also including nets on a cylindrical vertical portion. It is known that glass containers are manufactured by a forming machine called IS machine consisting of different independent forming sections supplied with drops of malleable glass. These forming sections are each equipped with at least one blanking cavity equipped with a blank mold, and with the same number of finishing cavities, each receiving a blow mold in which the containers take their final shape at high temperature.

Conventionally, the finish is formed in the blank mold. When the blank is transferred to the blow mold, the finish is already formed and the blank is held by the finish. To do so, the finish is formed by the finish molds composed of two half-molds forming the vertical wall of the finish and a mold part called ring which forms the finish surface or sealing surface of the finish. The blank mold also includes two blank body half-molds to form the wall of the body of the blank. During the forming by the press-and-blow process, a punch pushes the glass against the blank body half-molds. During the forming by the blow-and-blow process, the punch is shorter, it enters the finish mold, but it is the compressed air that pushes the glass against the blank body half-molds. Thus, the exterior of the vertical wall of the finish is formed by two finish half-molds, the upper surface of the finish is formed by the ring and the interior of the finish is formed by the punch. Consequently, each container finish R includes, as illustrated in FIG. 1, on either side of its vertical wall, a vertical mold seal JV corresponding to the interface between the two finish half-molds and a horizontal mold seal 311 corresponding to the interface between the finish mold part called ring and the two finish half-molds. These finish mold seals are more or less marked or apparent on the containers, depending on the adjustment of the parts of the mold which deteriorate with use.

It should be considered that the horizontal mold seal JH is located slightly below the finish surface S of the containers. Also, there appears the need to detect the defects that affect the horizontal seal of the mold of the containers to eliminate the containers which include defects that may affect their aesthetic nature or, more seriously, present a real danger for the user.

In the state of the art, the company AGR INTERNATIONAL proposes, by a DSG400 laboratory monitoring machine that accurately measures the dimensional characteristics of the containers, the possibility of detecting the defects in the horizontal mold seal known as knock out and flange. This machine comprises in particular a light source located on one side of the container and a camera located on the other side of the container. When capturing the images, the container is driven in rotation around its vertical axis. Such a machine does not seem designed to detect all the defects in the horizontal mold seal. Furthermore, this machine has a limited monitoring rate that does not allow monitoring the containers with the known production rates on the production lines of the containers.

Document WO 2013/128538 describes a method for detecting on the glass container finish defects in the horizontal mold seal. This method aims to ensure the rotation of the container on itself and to vertically project a light line onto the finish. A linear camera collects the light reflected by the finish. The method consists in analyzing the reflected light in order to deduce a defect in case of a variation in the profile of the reflected light. This method is only able to detect the flanges whose shape causes them to reflect light in the direction of the camera, and it does not allow quantifying the dimension of the defects and does not allow detecting different types of defects in the horizontal seal of the mold of the containers while having a very high level of reliability for detecting small defects.

The need therefore appears to have a technique making it possible to detect, at high rate, the various defects in the horizontal seal of the mold of the containers while having a very high level of reliability for detecting small defects, typically less than a mm, while avoiding considering defective containers while the horizontal seal of the mold of such containers actually meets the required quality criteria.

DISCLOSURE OF THE INVENTION

The object of the invention therefore aims to satisfy this need by proposing a method for detecting, at high rate on the glass container finish, defects in the horizontal mold seal such a method having a very high level of reliability to detect small defects in the horizontal mold seal while avoiding considering defective containers while the horizontal seal of the mold of such containers actually meets the required quality criteria.

To achieve such an objective, the object of the invention proposes a method for detecting, on the finish of glass containers each having a vertical axis, defects in the horizontal mold seal, the method comprising, for the detection of defects for each container, the following steps:

- disposing the container between a light source and an image capture camera whose optical axis of observation is substantially perpendicular to an axis parallel to the vertical axis of the container and whose field of view comprises at least the left edge of the finish or the right edge of the finish, including at least part of the horizontal mold seal;
- ensuring the rotation of the container on itself along the vertical axis according to at least one rotational revolution;
- acquiring by the camera, at each increment of rotation of the container, an image so that the number of images per rotational revolution is greater than 36;
- analyzing for each container, the images captured such that:
  - a finish inspection zone over a height of the finish including at least part of the horizontal mold seal is defined in the images;
  - the profile of the finish edge is detected in the image inspection zone;

the profiles of the finish edge of the images are compared with a reference profile of the finish edge, so as to detect deviations between these profiles of the finish edge and the reference profile of the finish edge;

and a defect in the horizontal mold seal for a container is detected when at least one image of said container has a deviation.

According to one advantageous variant of embodiment, the camera is disposed such that the field of view comprises at least part of the horizontal mold seal and a reference whose high-altitude position is known relative to the horizontal mold seal and in that to define the finish inspection zone in the images, the reference whose high-altitude position is known relative to the horizontal mold seal is sought, and the finish inspection zone is positioned relative to the reference such that the finish inspection zone extends over a height including the horizontal mold seal.

For example, all or part of the finish or counter-finish surface is sought in the images as a reference.

Typically, there is an image capture camera having the horizontal width of the field of view comprised between 5 mm and 130 mm and having the height of the field of view comprised between 3 mm and 20 mm.

For example, there is an image capture camera having a resolution greater than pixels/mm.

According to one preferred feature of implementation, the image capture camera is positioned such that its optical axis of observation is substantially tangent to the left or right edge of the finish.

The method according to the invention can use a camera provided with a telecentric lens.

According to one advantageous feature of embodiment, there is a light source having vertical and horizontal illumination dimensions comprised between 100% and 200% and preferably 120% of the dimensions of the field of view of the camera multiplied by the distance between the light source and the lens of the camera and divided by the distance between the axis of the containers and the lens of the camera.

According to another embodiment, there is a telecentric light source whose illuminated field has dimensions greater than or equal to the dimensions of the field of view of the camera.

According to one variant of embodiment, the profiles of the finish edge of the images are compared with a reference profile of the finish edge, by using as a reference profile, at least one profile obtained on at least one reference container considered to be compliant, so as to detect deviations.

According to another variant of embodiment, the profiles of the finish edge of the images are compared with a reference profile of the finish edge, by using as a reference profile an average profile calculated over several increments of rotation of at least one reference container considered to be compliant, so as to detect deviations.

According to another variant of embodiment, the profiles of the finish edge of the images are compared with a reference profile of the finish edge, by using as a reference profile a profile of the finish edge to which a low-pass filter is applied, so as to detect deviations.

According to another variant of embodiment, the profiles of the finish edge of the images are compared with a reference profile of the finish edge, by applying a high-pass filter on the profiles of the finish edge, so as to detect deviations.

Advantageously, for each image, the profile of the finish edge and the reference profile of the finish edge are compared for at least several altitudes in the inspection zone, by comparing at least one area, amplitude and/or slope measurement with a threshold and a deviation is detected when at least one of these measurements exceeds this threshold.

In general, the method consists in detecting at least one horizontal mold seal defect taken from among the following defects: knock out, flange and overhang/overmatch.

According to one preferred embodiment, at least one detection criterion is defined for each following defect, namely knock out, flange and overhang/overmatch, and the method consists in discriminating the defects detected among these three defects by using at least one of these detection criteria.

According to one feature of implementation, the shape of the deviations detected for several altitudes in the inspection zone is chosen as a detection criterion, for at least one image.

According to another feature of implementation, the angular extent of observation of the deviations corresponding to the number of successive images in which a deviation is detected is chosen as a detection criterion.

To discriminate the overhang/overmatch defect relative to the knock out and flange defects, the shape of the deviations detected for several altitudes in the inspection zone is analyzed.

To discriminate the knock out defect relative to the flange defect, the angular extent of observation of the deviations is analyzed, by considering that a knock out defect is detected when the angular extent of observation of the deviations is below a fixed maximum limit.

To discriminate the knock out defect relative to the flange defect, the angular extent of observation of the deviations is analyzed, by considering that a flange defect is detected when the angular extent of observation of the deviations is above a fixed minimum limit.

Conventionally, for each container with a horizontal mold seal defect, a signal is sent to eject the container from a production line.

According to one advantageous feature of implementation, the container is rotated on itself along the vertical axis according to at least one rotational revolution for a maximum duration of 200 ms.

Another object of the invention is to propose an inspection device implementing the method in accordance with the invention for detecting, on the glass container finish, defects in the horizontal mold seal.

DESCRIPTION OF THE EMBODIMENTS

Figure 2:
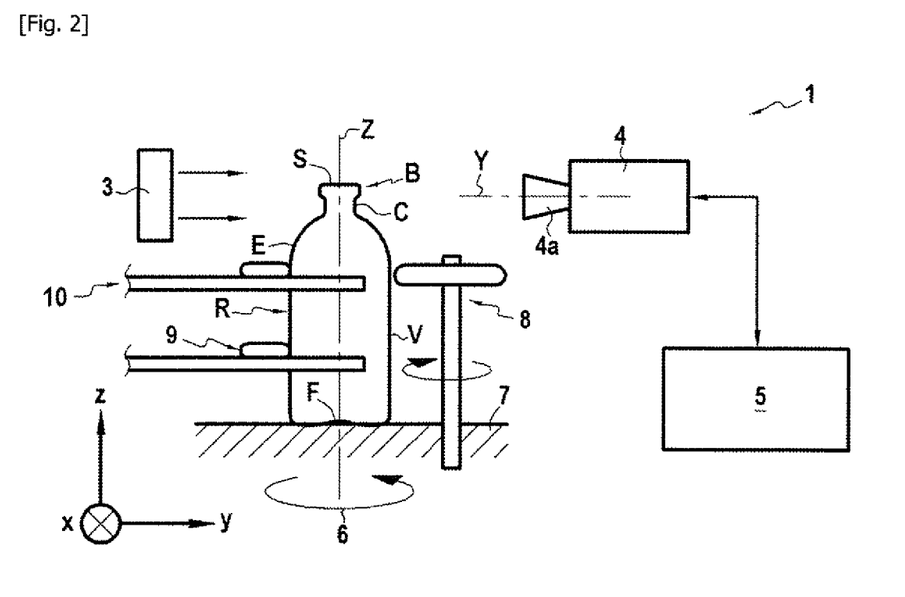
FIG. 2 is a schematic elevational view showing a device for implementing the method according to the invention, for detecting horizontal mold seal defects on the glass container finish.

As seen more specifically from FIGS. 1 and 2, the object of the invention relates to a device 1 for implementing a method in accordance with the invention for detecting horizontal mold seal JH defects on glass containers R. Conventionally, a container R has a bottom F from which a vertical cylindrical wall V ending in a part called finish part B rises along a vertical axis Z. In the case of a container R of the bottle type, the vertical cylindrical wall V presents from the bottom F, a part forming the body of the bottle which is connected to a collar C via a shoulder E.

Each container R includes, as illustrated in FIG. 1, in particular a horizontal mold seal JH corresponding to the interface between the mold part called ring and the two half-molds forming the vertical cylindrical wall V of the container. By definition, the horizontal mold seal JH is located slightly below the finish surface S, corresponding to the planar surface for the sealing of the container. The horizontal mold seal JH extends over the entire circumference of the finish.

In accordance with the invention, the method consists in detecting on each container a defect in the horizontal mold seal JH taken from among the following defects: knock out JHK, flange JHF and overhang/overmatch JHO.

Figure 3A:
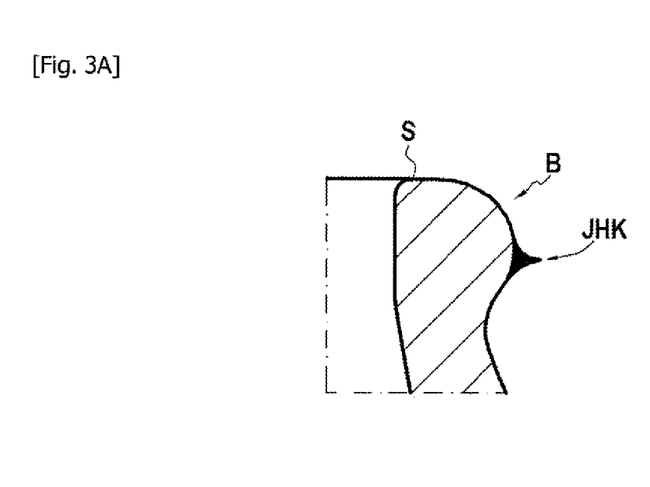
FIGS. 3A-3B are respectively a side view of the finish edge and a top view of a finish of a glass container having a horizontal mold seal defect of the knock out type.
Figure 3B:
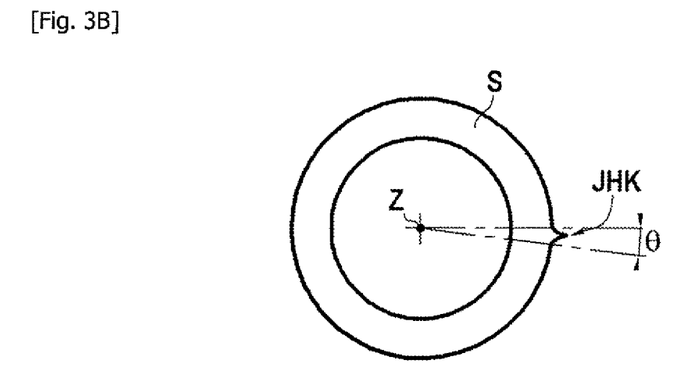

As seen more specifically in FIGS. 3A and 3B, a knock out JHK defect corresponds to a glass flange at one of the T-shaped intersections of the horizontal mold seal JH and of the vertical mold seal JV between the mold part called ring and the two half-molds forming the vertical wall. This defect corresponds to a glass flange created by blunt ridges at the interface of the three molds or at a poor adjustment between them. This knock out JHK takes the form of a tip-shaped or needle-shaped (often of triangular cross-section) glass protrusion with a small thickness along the direction of the vertical axis Z and with a small extent horizontally, often less than a millimeter. Consequently, it has a small circumferential angular extent θ taken around the vertical axis Z. Typically, the knock out JHK has a small circumferential angular extent θ of less than a few degrees.

Figure 4A:
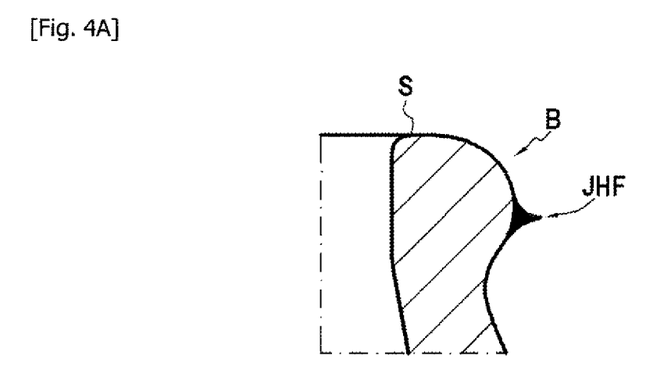
FIGS. 4A-4B are respectively a side view of the finish edge and a top view of a finish of a glass container having a horizontal mold seal defect of the flange type.
Figure 4B:
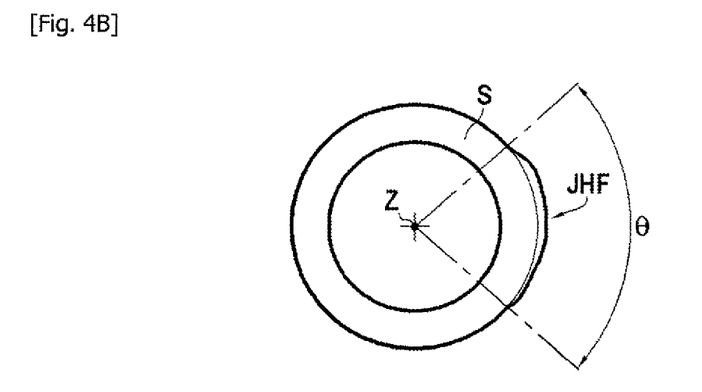

As seen more specifically in FIGS. 4A and 4B, a flange JHF defect corresponds to an excess of glass resulting from a poor adjustment between the mold part called ring and the two half-molds forming the vertical wall. This flange JHF takes the form of a thin glass slide along the direction of the vertical axis Z. Furthermore, this flange JHF has a significant angular extent θ taken around the vertical axis Z. Typically, the flange JHF has a significant angular extent θ greater than or equal to 10° but quite easily greater than 30°. It can be much wider, up to 180°. More rarely, the flange may be present over the entire circumference.

Figure 5A:
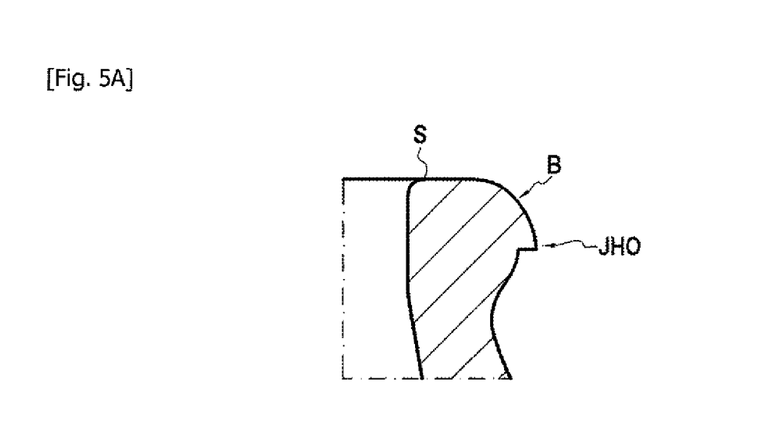
FIGS. 5A-5B are respectively a side view of the finish edge and a top view of a finish of a glass container having a horizontal mold seal defect of the overhang/overmatch type.
Figure 5B:
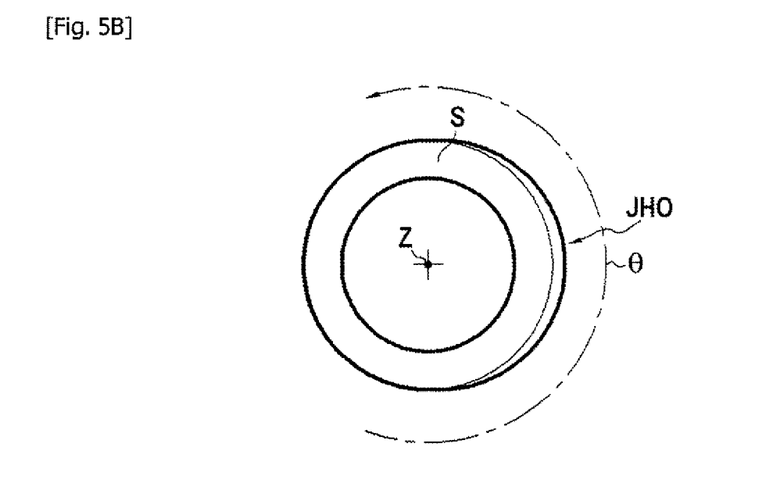

As seen more specifically in FIGS. 5A and 5B, an overhang/overmatch JHO defect corresponds to an excess of glass resulting from a displacement of the mold part called ring and the two half-molds forming the vertical wall. This overhang/overmatch JHO takes the form of a very thick glass protrusion along the direction of the vertical axis Z with a significant angular extent θ taken around the vertical axis Z. Typically, the offset of the ring can appear over 180°, but the step created is generally significant over an angular extent θ greater than or equal to 90°.

As will be explained in detail in the following description, the object of the invention is to detect a container having a defect in the horizontal mold seal JH taken from among either or both of the knock out JHK, flange JHF and overhang/overmatch JHO defects. According to one advantageous variant of embodiment, the object of the invention aims to discriminate a defect in the horizontal mold seal JH taken from among the knock out JHK, flange JHF and overhang/overmatch JHO defects.

To this end, the device 1 for implementing the method for detecting defects in the horizontal mold seal JH includes a fixed light source 3 disposed on one side of the container R and a fixed image capture camera 4 disposed on the other side of the container R. This camera 4 which includes a lens 4a is adapted to capture images in which appears at least part of the horizontal seal JH of the mold of the containers R. This camera 4 is connected to an analysis and processing unit 5 configured to analyze the captured images and detect a defect in the horizontal seal JH of the mold of the containers R.

The images of a container R are captured while the container R is rotated on itself along its vertical axis Z for at least one rotational revolution, which allows the entire horizontal mold seal JH to run in front of the camera. Each container R is supported by a rotation system 6. For example, the rotation system 6 includes a gliding or laying plane 7 for the bottom F of the container R as well as a drive system 8 of all types known per se. The drive system 8 is piloted such that each container R remains between the light source 3 and the camera 4 for the time necessary to perform at least one revolution on itself during which images are captured by the camera 4 as will be explained later in the description.

For example, the rotation system 6 includes as a drive system a wheel or spinner 8 driving the container in rotation by friction, while the container is secured in support on at least two free casters or rollers 9. The rollers for example form part of a transport starwheel 10 which transports the containers R on a circular path, to bring them successively into support and sliding on a laying plane 7, in front of the detection device 1. Advantageously, this transport starwheel 10 forms part of an inspection machine, which inspects more than 150 containers per minute, including one or more stations for inspecting the running containers at the outlet of a production line. In other words, the detection device 1 in accordance with the invention can be implemented in addition to the inspection stations placed conventionally to inspect the containers on the production line, without reducing the run rate of the containers in these stations which integrate a rotation of the containers for this inspection.

According to a feature of the invention, the inline inspection machine inspects between 50 and 500 containers per minute, typically between 150 and 450 containers per minute. For each container, the method includes a transport step consisting in bringing the container R and disposing the container R between the light source 3 and the image capture camera 4, and a step of ensuring the rotation of the container R on itself along the vertical axis Z according to at least one rotational revolution, during which the images are acquired. It should be noted that with the transport starwheel 10, the previously inspected container is taken to the inspection station at the same time as a new container to be inspected is brought in. The inline inspection machine is therefore equipped with high-rate handling means. For a rate of 150 containers per minute, the duration of the rotation and inspection step is a maximum of 200 ms. According to one preferred feature of the invention, the complete rotation of a container lasts a maximum of 100 ms. It is also often chosen that the container makes 1.5 revolutions.

In other words, the method according to the invention consists in disposing the container R between a light source 3 and an image capture camera 4 whose optical axis of observation is substantially perpendicular to an axis parallel to the vertical axis Z of the container and whose field of view comprises at least the left edge of the finish or the right edge of the finish, including at least part of the horizontal mold seal, in ensuring the rotation of the container R on itself along the vertical axis Z according to at least one rotational revolution in less than 200 ms, and in acquiring by the camera 4, at each increment of rotation of the container, an image so that the number of images per rotational revolution is greater than 36.

According to one feature of the invention, the camera 4 is piloted such that at each increment of rotation of the container, an image is captured so that the number of images per rotational revolution is greater than 36. In other words, the method according to the invention aims to acquire at least one image every 10° of rotation of the container R. For example, the number of images of a container R over 360° is comprised between 36 and 96. The increment of rotation of the container between each captured image represents an angular sector traversed by the finish ranging for example from 10° to less than 1°. Of course, a fast camera with less than 500 has of integration time and a reading time of 0.5 ms would make it possible to acquire 400 images per revolution in 200 ms. The increase of the acquisition frequency leads to greater accuracy, in particular in the estimation of the radial length of a knock out. It results in a higher cost of the system by the price of a fast camera 4 and the computing power that the analysis and processing unit 5 will have to possess.

In accordance with the invention, the light source 3 and the camera 4 are adapted so that the camera can acquire, during the rotation of the container around its vertical axis Z, images I in which at least part of the horizontal seal JH of the mold of the container R appears. As illustrated in FIG. 2, it is considered by convention that the vertical axis Z of the container is parallel to the vertical direction z of an orthogonal reference frame x, y, z. This vertical direction z is perpendicular to the transverse direction y passing through the light source 3 and the camera 4 while the lateral direction x is perpendicular to the transverse direction y and to the vertical direction z.

The container R is positioned between the light source 3 and the camera 4 whose optical axis of observation Y extends parallel to the transverse direction y that is to say along a direction substantially perpendicular to the vertical direction z. This camera 4 has a field of view extending laterally along the lateral direction x orthogonal to the vertical direction z and to the optical axis of observation Y. The field of view of the camera 4 therefore extends in the plane defined by the vertical direction z and the lateral direction x. According to one preferred example, the camera 4 is positioned such that its optical axis is substantially tangent to the left or right edge of the finish.

According to the vertical direction z, the field of view of the camera 4 comprises at least the horizontal mold seal JH. The field of view of the camera 4 comprises at least the left edge of the finish B or the right edge of the finish B. According to one preferred variant of implementation, the field of view of the camera 4 comprises, for good resolution, only either the left edge of the finish B or the right edge of the finish B. Of course, the method according to the invention can be implemented with a camera whose field of view is not limited to a right or left edge. This preferred variant is particularly suitable for high rates, knowing that the in-line inspection machines rotate the containers on at least one revolution and therefore the observation of a single side is sufficient to guarantee the observation of the defects in the horizontal seal JH of the mold of the finish. Moreover, single-sided observation allows making optimal use of the field of view of a camera and placing its optical axis tangent to the observed finish edge.

Figure 6:
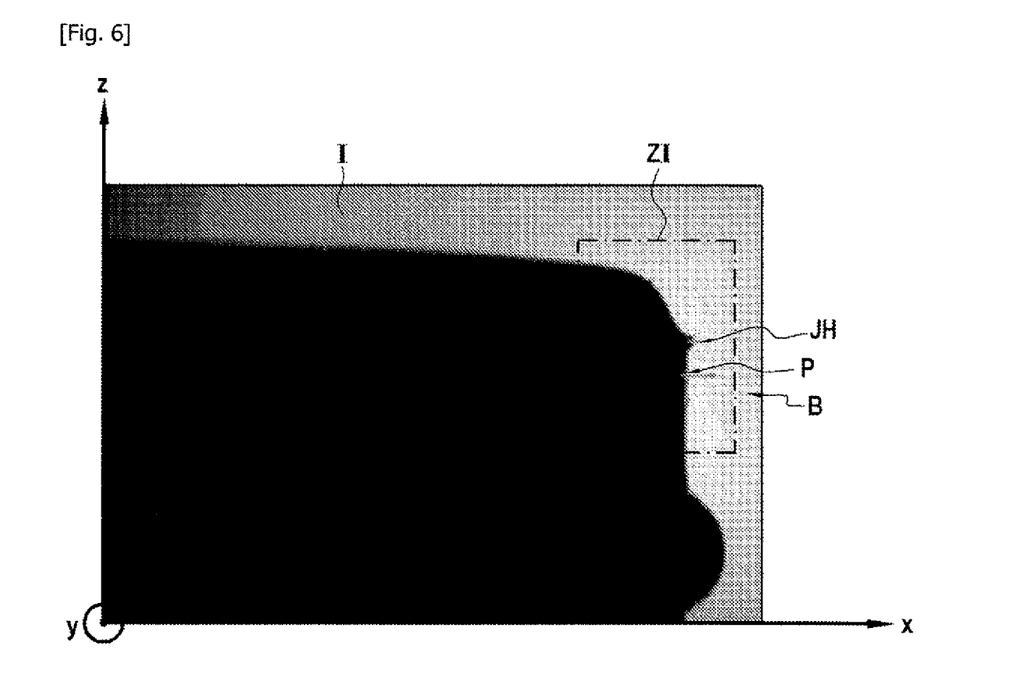
FIG. 6 is an example of an image of the right edge of a finish of a glass container with a defect in the horizontal mold seal.

This camera 4, such as a matrix camera, transmits to the analysis and processing unit 5, for each increment of rotation, a horizontal projection of the finish, in which stands out at least one edge of the finish called left edge or right edge in consideration of their position appearing on each of the images captured by the camera (FIG. 6). The qualification left or right is thus given from the point of view of the observation at every shot because a container of revolution does not, strictly speaking, include a left or right side. In the example illustrated in FIG. 6, the image I corresponds to a right edge of the container R.

In each image captured by the camera thus appears at least the left edge of the finish B or the right edge of the finish B making it possible to visualize at least part of the horizontal mold seal JH and at least the profile P of the finish edge. In other words, and as seen in FIG. 6, each image I must include on an altitude or a height taken along a direction parallel to the vertical direction z, at least part of the contour or of the profile P of the finish edge including at least part of the horizontal mold seal JH. It is thus defined in each image, an inspection zone ZI corresponding to a horizontal strip of the image having a determined height to include part of the profile P of the finish edge including part of the horizontal mold seal JH.

According to one advantageous feature of implementation, the camera 4 is disposed such that its field of view comprises at least part of the horizontal mold seal JH and a reference whose high-altitude position is known relative to the horizontal mold seal JR. It is thus possible, after having found said reference in the images, to position the finish inspection zone ZI relative to the reference such that the finish inspection zone extends over a height including undoubtedly the horizontal mold seal.

Of course, this image capture is carried out in addition with a margin to visualize this reference and part of the horizontal mold seal JH while taking into account the dispersions of positioning of the containers R relative to the camera 4 and the manufacturing tolerances of the containers R. This margin is for example at least +/−2 mm when the height of the containers can vary by +/−2 mm.

It must be understood that this reference presented by the containers R is a remarkable element such as, for example, an outline, an angle, a shape that can be located in the images. This remarkable element is also visible in all the images captured during the rotation of the article on a revolution, and its vertical position in each image can be determined unequivocally, its vertical distance Dv to the horizontal mold seal JH being known in each image, therefore preferably this distance is constant. The location of this reference in the images makes it possible to assign a position reference system to each of the images, which can be used in the analysis of the images.

Typically, for example all or part of the finish S or of the counter-finish CB surface when a container includes one, can be taken as a reference. In the case where the finish surface S is taken as a reference, the camera 4 is adjusted such that the height of its field of view includes the finish surface S plus a margin to take into account positioning dispersions and manufacturing tolerances of the containers. Similarly, the camera 4 is adjusted such that the height of its field of view includes the horizontal mold seal JH plus a margin.

The horizontal width of the field of view of the camera 4 is adapted to include the profile P of the finish edge with a margin and the reference, namely part of the finish surface in the example considered. According to one preferred variant, the width of the field is chosen to include only a finish edge plus the necessary margins. For example, the camera 4 has a horizontal width of the field of view preferably comprised between 5 mm and 80 mm and a height of the field of view comprised between 3 mm and 20 mm. This makes it possible to optimize the field of the camera that is to say to limit the unnecessary areas of the sensor. According to another variant, the two left and right edges of the finish are included in the field of view, and the field width can reach 130 mm to observe 120 mm-diameter finishes and a 10 mm margin.

For example, camera 4 is a matrix camera combined with an optical lens, the whole making it possible to observe the inspection zone with a resolution greater than 25 pixels/mm.

The light source 3 is made in any suitable way to ensure a backlighting of the container R adapted to capture images by the camera 4.

According to one preferred feature of embodiment, the light source 3 has determined vertical and horizontal illumination dimensions. Conventionally, the vertical dimension is taken along the vertical direction z while its horizontal dimension is parallel to the lateral direction x. In a non-telecentric optical system, the dimensioning DL of the light source 3 is of the type:

DL=CH×DI/DC; with CH field of view of the camera 4, DI distance between the light source 3 and the camera lens 4a, DC distance between the inspected zone and the camera lens considering more specifically the DC distance as the distance between the camera lens (for example the optical center of a non-telecentric lens) and the plane of focus containing the vertical axis Z of the container and the point of tangency with the finish edge of an optical ray passing through the optical center. The vertical and horizontal illumination dimensions are the dimensions of the useful area of the light source 3 observable by the camera 4.

According to one feature of embodiment, the light source 3 has vertical and horizontal illumination dimensions comprised between 100% and 200% and preferably 120% of the dimensions of the field of view of the camera 4 multiplied by the distance between the light source 3 and the lens 4a of the camera and divided by the distance between the vertical axis Z of the containers and the lens 4a of the camera.

According to one variant of embodiment, the light source 3 can be a telecentric light source whose illuminated field has dimensions greater than or equal to the dimensions of the field of view of the camera 4. The light source 3 thus generates for the field of view of the camera, a beam whose average rays are parallel to the optical axis of the camera. In this case, it should be noted that the lens 4a of the camera is a telecentric lens.

The images captured by the camera 4 for each container R are analyzed by the analysis and processing unit 5 configured to detect a defect in the horizontal seal JH of the mold of the containers R. The method for detecting a defect in the horizontal mold seal JH consists in analyzing for each container, the captured images and particularly in each image, the finish inspection zone ZI over a height of the finish including at least part of the horizontal mold seal. This analysis method consists in detecting, in the image inspection zone, the profile P of the finish edge and in comparing the profiles P of the finish edge of the images with a reference profile Pf of the finish edge, so as to detect deviations between these profiles P of the finish edge and the reference profile Pf of the finish edge. A defect in the horizontal mold seal for a container is detected when at least one image of the container R has a deviation. For each container having a horizontal mold seal defect JH, the analysis and processing unit 5 sends a signal informing of the defective quality of the container, such a signal being able to control an ejector for ejecting the container from the production line.

The detection of the profile P of the finish edge in each of the captured images can be carried out by any appropriate image processing method.

As explained above, the analysis of the images is preferably limited to the finish inspection zone ZI in which part of the finish profile P including the horizontal mold seal appears. Advantageously, the inspection zone is positioned relative to a reference of the container appearing in the image and whose high-altitude position is known relative to the horizontal mold seal. This variant of implementation limits the analysis of the finish profile to the portion just necessary to characterize the horizontal mold seal while eliminating the other profile parts that may be confused with a horizontal mold seal, such as those including a net for example.

According to this method, the reference whose high-altitude position is known relative to the horizontal mold seal is sought in each image and the finish inspection zone is positioned relative to the reference such that the finish inspection zone extends over a height necessarily including the horizontal mold seal JH.

Figure 7:
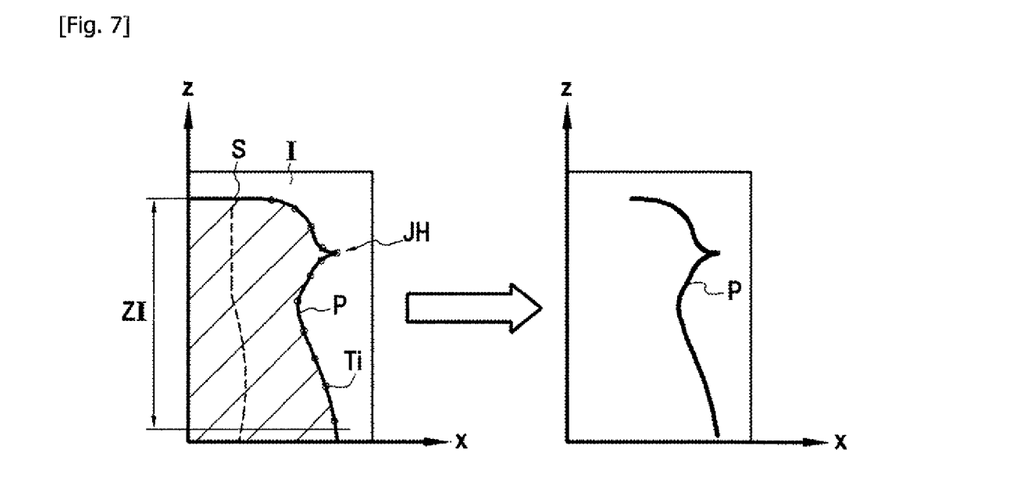
FIG. 7 is a diagram explaining the extraction, in an image, of the profile of the edge of a finish of a container having a defect in the horizontal mold seal.

FIG. 7 illustrates by way of example the detection of the profile P of the right edge of a finish in an image I in which the finish surface S appears as a reference. The first step consists in locating in height that is to say along the vertical direction z, the position of the finish surface S. For example, along a vertical line which follows the left edge of the image, a vertical gray level transition corresponding to the finish surface S is detected. It is then possible to position the inspection zone ZI from this reference such that the inspection of the image can necessarily take into account the horizontal mold seal JH.

Of course, the method for searching the reference can be different. For example, in the case where the reference is the counter-finish, a search for the maximum two-dimensional correlation can be implemented between the image and a reference window containing a learned model of the counter-finish or of the right or left visible edge of the counter-finish.

The second step consists in extracting the outer contour or the profile of the finish edge P for example from the finish surface S to the lower limit of the inspection zone ZI located below the finish surface and beyond the horizontal mold seal ZH. As illustrated in FIG. 7, the finish edge profile P includes the horizontal mold seal JH. The search for a first profile point of the finish edge P can consist in browsing the image horizontally, at a given height relative to the reference, until detecting a horizontal gray level transition.

The extraction, in each image, of the profile of the finish edge P can be carried out using any image processing method. For example, it can be provided in the inspection zone ZI to search, for each altitude taken along the vertical direction z, for the external edge of the finish by searching for a black/white transition Ti or from the outside, for a white/black transition. The position of this transition Ti along the lateral direction x is determined relative to the vertical direction z. The search for this transition Ti is carried out at each altitude and over the entire height of the inspection zone ZI. As illustrated on the right of FIG. 7, for each image, the profile P of the finish edge can be obtained in the form of a curve referenced in the plane z, x. For example, the profile P consists of all the transitions Ti, for each of which the coordinates x and z are known.

Figure 8:
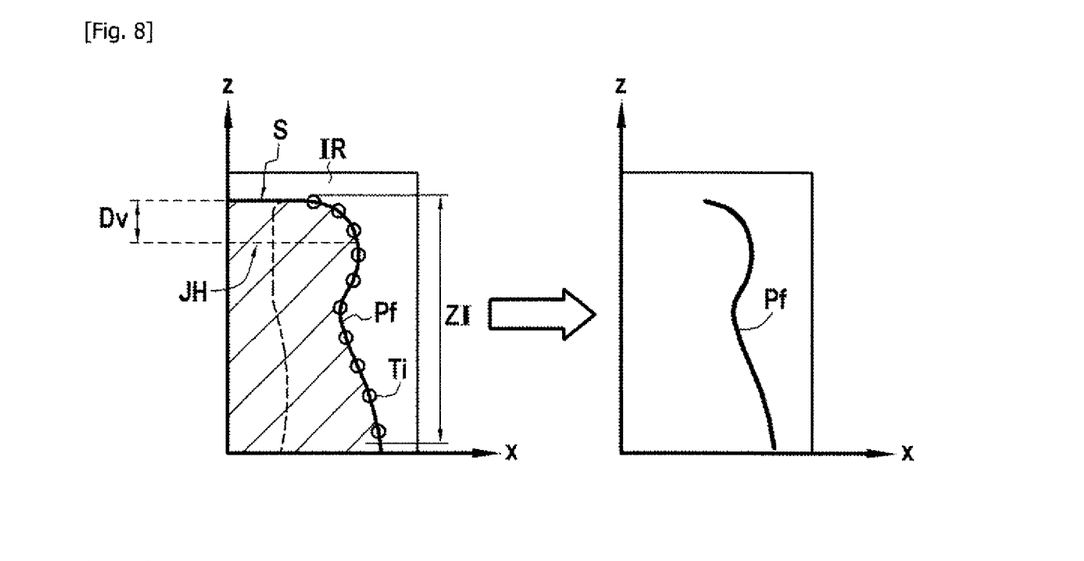
FIG. 8 is a diagram explaining the extraction, in an image, of the reference profile of the edge of a finish from a compliant container.

The next step consists in comparing the profile of the finish edge P with a reference profile Pf of the finish edge, obtained by various possible means. According to one preferred variant of the invention, as seen in FIG. 8, the extraction of the reference profile Pf from the finish edge is carried out analogously to the extraction of the profile of the finish edge P of a container illustrated in FIG. 7. To this end, for a reference container including a reference profile Pf of the finish edge including part of a horizontal reference mold seal without defect, an image is captured making it possible to visualize this reference profile Pf of the finish edge and as a reference, the finish surface. This reference image is advantageously made under the same conditions as the images for the containers to be inspected, using the inspection device by positioning the reference container between the camera 4 and the light source 3. The analysis of this image according to the method described above makes it possible to extract the finish edge reference profile Pf and in which the horizontal mold seal without defect appears.

According to another variant of embodiment, the reference profile Pf of the finish edge is obtained by learning from several images of a container or from images of several containers considered to be compliant. For example, a mathematical operation of any type can be performed on the images or on profiles extracted from images. Thus, as reference profile Pf, one or more profiles obtained on a reference container considered to be compliant or on several reference containers considered to be compliant can be chosen. Similarly, as a reference profile Pf, an average profile calculated over several increments of rotation of a reference container considered to be compliant or of several reference containers considered to be compliant can be chosen. According to another variant of embodiment, the reference profile Pf of the finish edge can also be obtained from a manufacturing plane or from any geometrical models of containers.

Figure 11:
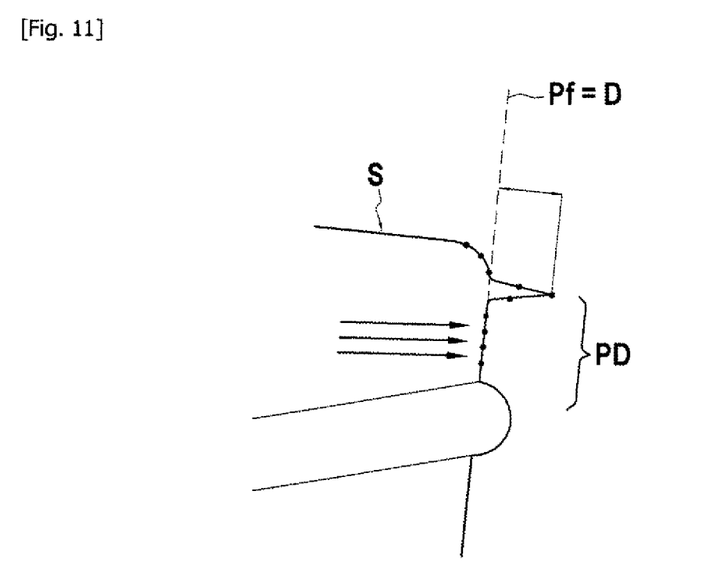
FIG. 11 is a diagram explaining the extraction, in an image, of the reference profile of the finish edge in the form of a straight line for a screw finish.

According to another variant of the invention illustrated in FIG. 11, in the case for example of screw finishes as illustrated in FIG. 1, the finish edge includes a cylindrical portion, and therefore the profile of the finish edge includes a right portion PD. In this case, the reference profile Pf of the finish edge can be a simple reference straight line D passing at best through the straight part PD of the profile of the finish edge P, therefore through the points Ti of this part of the finish contour, or a straight line parallel thereto.

Figure 12:
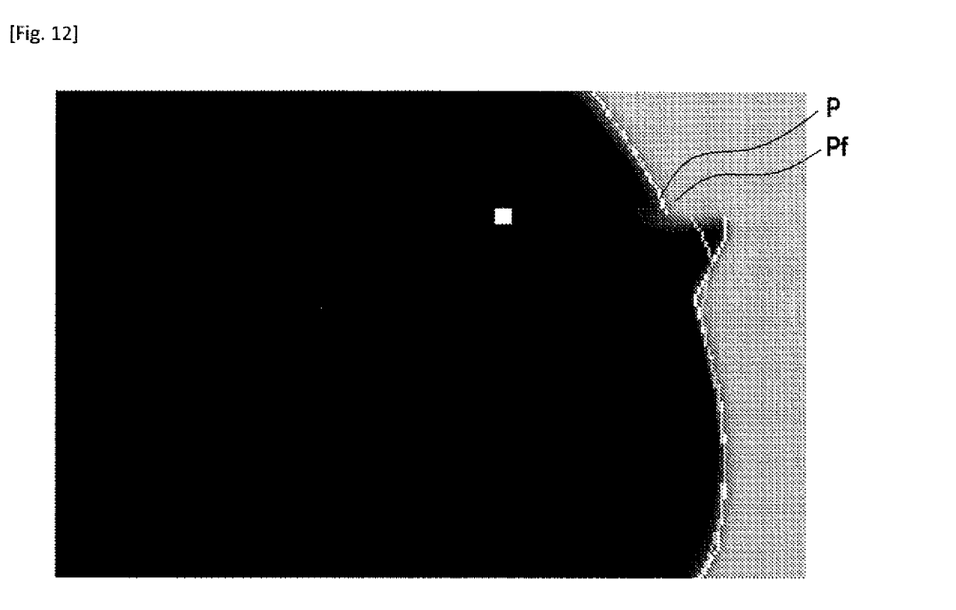
FIG. 12 is an example of an image of the right edge of a finish of a container with a knock out defect, on which the profile of the container and a reference profile appear.

According to another variant of embodiment illustrated in FIG. 12, the invention aims to use as a reference profile Pf, a profile of the finish edge to which a low-pass filter is applied. In other words, the reference profile Pf corresponds to the profile of the finish edge to which a filtering or a smoothing is applied. As an example in FIG. 12, the profile P of the finish edge (in white) corresponds to the raw profile extracted from the image while the reference profile Pf (in gray) corresponds to the moving average of the profile P. Of course, different types of low-pass filters can be applied, such as averaging, Gaussian, median or phase-shifted median filter.

According to another variant of embodiment, it should be noted that it may be envisaged to apply a high-pass filter on the profiles of the finish edge, to compare the profiles of the finish edge P of the images with a reference profile Pf of the finish edge. The application of a high-pass filter, for example of the gradient type, makes it possible to highlight deviations, that is to say strong variations or rapid variations in the derivative of the finish edge profile, reflecting the presence of a local irregularity. The presence of such deviations corresponds to a defect in the horizontal mold seal.

The comparison step for each image, between the profile of the finish edge P of an image and the reference profile Pf of the finish edge leads to detecting whether there are deviations between these profiles of the finish edge and the reference profile of the finish edge. A defect in the horizontal mold seal for a container is detected when at least one image of said container has a deviation.

This comparison leading to the observation or not of a horizontal mold seal defect can be implemented according to various analysis methods.

For each image, for at least several altitudes and preferably for all the altitudes in the inspection zone ZI, the profile of the finish edge P and the reference profile of the finish edge Pf are compared. This step aims to compare at least one area, amplitude and/or slope measurement with a threshold and a deviation is detected when at least one of these measurements exceeds this threshold. Typically, an area measurement can correspond to the area between the profile of the finish edge P and the reference profile Pf of the finish edge. An amplitude measurement can correspond to a difference between the profile of the finish edge P and the reference profile Pf of the finish edge, taken along the lateral direction x. A slope measurement can correspond to a measurement of the slope of the curve obtained by subtraction of the profile of the finish edge P and of the reference profile Pf of the finish edge. Another possible measurement is the difference between two amplitudes of the finish edge profile P and the finish edge reference profile Pf, taken at equal or different altitudes.

According to one variant of embodiment, to compare the profile P of the finish edge and the reference profile Pf of the finish edge, the actual position of the finish edge is taken into account, including an inclination in the image related to the inclination of the finish relative to the axis Z, due to the handling hazards during the monitoring, or to a lack of verticality of the container. Such an inclination of the finish is for example illustrated in FIG. 11. It should be noted that in the case where the reference profile of the finish edge Pf is a straight line D passing through the straight part PD of the finish profile, it is possible in this simplified variant to determine a deviation by measuring the distance of the points of finish profile P to the reference straight line D.

Figure 9:
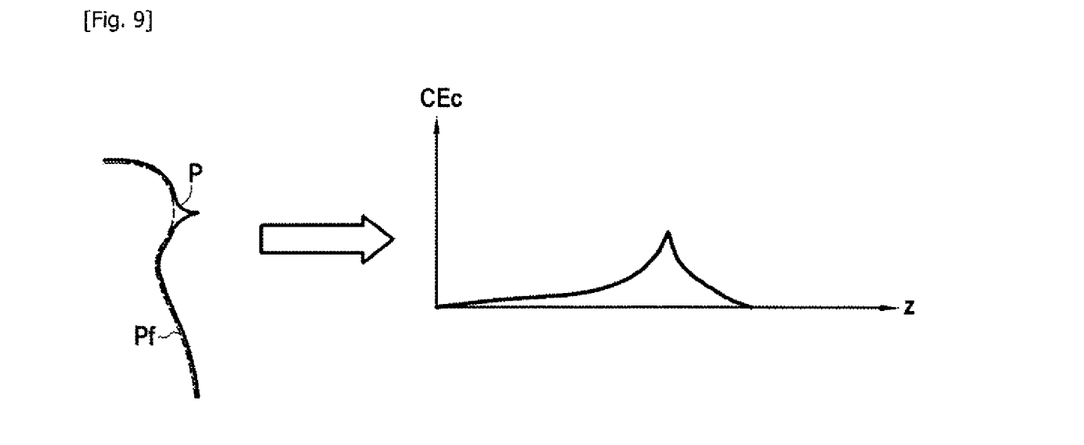
FIG. 9 is a diagram explaining the comparison between the profile of the edge of a finish of a container having a horizontal mold seal defect of the flange or knock out type and the reference profile of the edge of a finish of a container.

In the example illustrated in FIG. 9, the curve CEc is the curve corresponding to the deviation between the profile of the finish edge P and the reference profile of the finish edge Pf, this curve evolving along the axis vertical z that is to say as a function of the altitude in the inspection zone. Different examples of possible measurements of the deviation curve CEc make it possible to estimate the size of the deviation and/or its shape, and at the same time to estimate the presence of a defect, possibly its type and its dangerousness. Account can for example be taken of the point of maximum amplitude of this curve corresponding to the end of a protuberance furthest from the vertical axis Z of the container. This maximum amplitude corresponds to the height of the peak of the deviation curve CEc, which gives a correct estimate of the radial length of the knock out or the flange, which constitutes a very good physical criterion of dangerousness of the defect. This amplitude can be compared with a threshold value and a deviation (or defect) is detected if this measurement exceeds this threshold.

The threshold can be adjustable in order to parameterize the severity of the inspection, for example the operator can thus decide that slightly marked knock outs are tolerated.

If the measurement allowing the detection of a deviation is the area of a surface obtained by subtraction of the finish edge profile and the finish edge reference profile, the measurement is for example the integral of the deviation curve CEc. If the measurement is a slope, it can be the maximum slope of the deviation curve CEc, or a deviation between two successive slopes of the deviation curve CEc on either side of a peak or a threshold crossing.

It is apparent from the foregoing description that the method according to the invention consists in detecting at least one horizontal mold seal JH defect taken from among the following defects: knock out JHK, flange JHF and overhang/overmatch JHO.

According to one advantageous variant of embodiment, the method according to the invention makes it possible to discriminate the defects detected among these three defects, namely knock out JHK, flange JHF and overhang/overmatch JHO. For this purpose, at least one detection criterion is defined for each defect, namely knock out, flange and overhang/overmatch, and at least one of these detection criteria is used to distinguish between the defects. It thus appears possible to identify the type of defect making it possible to refine the inspection of the containers.

Figure 10:
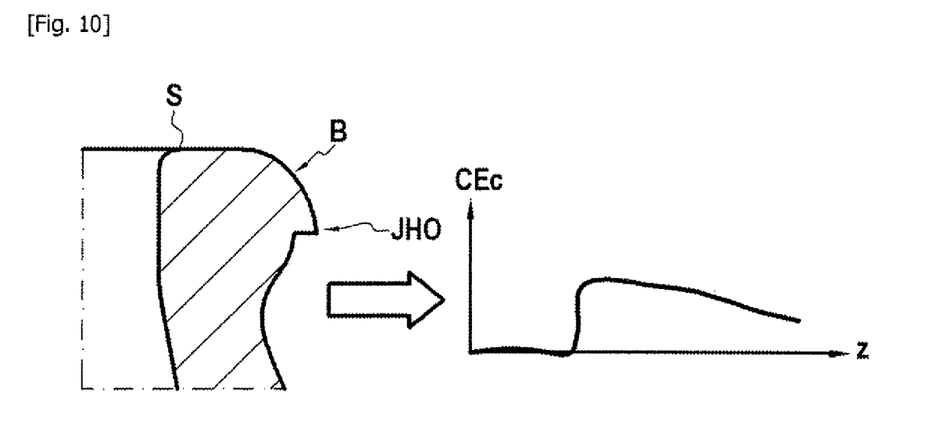
FIG. 10 is a diagram explaining the comparison between the profile of the edge of a finish of a container having a horizontal mold seal defect of the overhang/overmatch type and the reference profile of the edge of a finish of a container.

According to one exemplary embodiment, the shape of the deviations detected for several altitudes in the inspection zone is chosen as the detection criterion, for at least one image. For example, the shape of a deviation can be described in different ways, for example by means of measurements of slopes or amplitudes, taken at several consecutive altitudes. This shape can be observed on the deviation curve CEc. In FIG. 9, the deviation curve CEc has a peak, characterizing a knock out or a flange, but if the defect is an overhang/overmatch like FIG. 5A, the deviation curve CEc will have an echelon shape as illustrated in FIG. 10.

According to another exemplary embodiment, there is chosen as detection criterion the angular extent of observation of the deviations corresponding to the number of successive images in which a deviation is detected, that is to say at the angle of rotation of the container during which the deviation is detected in the images. The angular extent of observation of the deviations for a defect of the flange or overhang/overmatch type is very close to the circumferential angular extent of the defect seen from above, as is clearly seen in FIGS. 3B, 46 and 5B. For a knock out, the angular extent of observation is greater than its circumferential angular extent. If for example the increment of rotation between two image acquisitions is of 4°, and a knock out has a very small circumferential angular extent of 2°, and if it is long enough, then it can be visible in several successive images, respectively two or three, separated in time by one or more increments of rotation, and therefore its angular extent of observation is respectively 8° or 12°.

Of course, each of these criteria can be implemented independently of each other or in combination one after the other, one of these criteria can be applied before the other and vice versa.

According to one example of implementation, the shape of the deviations detected for several altitudes in the inspection zone is analyzed to discriminate the overhang/overmatch JHO defect relative to the knock out JHK and flange JHF defects. Indeed, as clearly seen from FIG. 5A, the overhang/overmatch JHO defect is distinguished in particular by its echelon or crenellation shape relative to the knock out (FIG. 3A) and flange (FIG. 4A) defects which are characterized by a sharp protuberance.

According to another example of implementation, the angular extent of observation of the deviations is analyzed to discriminate the knock out JHK defect relative to the flange JHF defect, considering that a knock out defect is detected when the angular extent of observation of the deviations is below a maximum limit, fixed for example at 30°. In other words, a knock out JHK defect is detected when the number of successive images in which a deviation is detected corresponds to an angular extent of observation below the maximum limit fixed for example at 30°.

According to another example of implementation, the angular extent of observation of the deviations is analyzed to discriminate the knock out JHK defect relative to the flange JHF defect, considering that a flange defect is detected when the angular extent of observation of the deviations is above a minimum limit fixed for example at 30°. In other words, a flange JHF defect is detected when the number of successive images in which a deviation is detected corresponds to an angular extent of observation above the minimum limit fixed for example at 30°.

According to the invention, the thresholds applied to the measurements to detect the deviations, the discrimination criteria such as those employed either in the comparison of the shapes of profiles, and/or those employed as minimum or maximum values of angular extent of observation, are stored in the analysis and processing unit 5, and preferably adjustable by an operator depending on the containers inspected and the qualities required.

The invention claimed is:

1. A method for detecting, on the finish (B) of glass containers (R) each having a vertical axis (Z), defects in the horizontal mold seal (JH), the method comprising, for the detection of defects for each container, the following steps:
    disposing the container (R) between a light source (3) and an image capture camera (4) whose optical axis of observation is substantially perpendicular to an axis parallel to the vertical axis (Z) of the container and whose field of view comprises at least the left edge of the finish or the right edge of the finish, including at least part of the horizontal mold seal;
    ensuring the rotation of the container (R) on itself along the vertical axis (Z) according to at least one rotational revolution;

acquiring by the camera (4), at each increment of rotation of the container, an image so that the number of images per rotational revolution is greater than 36;

analyzing for each container, the images captured such that:

a finish inspection zone (ZI) over a height of the finish including at least part of the horizontal mold seal is defined in the images;

the profile (P) of the finish edge is detected in the image inspection zone;

the profiles of the finish edge (P) of the images are compared with a reference profile (Pf) of the finish edge, so as to detect deviations between these profiles of the finish edge and the reference profile of the finish edge;

and a defect in the horizontal mold seal (JH) for a container is detected when at least one image of said container has a deviation.

2. The method according to claim 1, according to which the camera (4) is disposed such that the field of view comprises at least part of the horizontal mold seal (JH) and a reference whose high-altitude position is known relative to the horizontal mold seal and in that to define the finish inspection zone (ZI) in the images, the reference whose high-altitude position is known relative to the horizontal mold seal is sought, and the finish inspection zone (ZI) is positioned relative to the reference such that the finish inspection zone extends over a height including the horizontal mold seal.

3. The method according to claim 2, according to which all or part of the finish(S) or counter-finish (CB) surface is sought in the images as a reference.

4. The method according to claim 1, according to which there is an image capture camera (4) having the horizontal width of the field of view comprised between 5 mm and 130 mm and having the height of the field of view comprised between 3 mm and 20 mm.

5. The method according to claim 1, according to which there is an image capture camera (4) having a resolution greater than 25 pixels/mm.

6. The method according to claim 1, according to which the image capture camera (4) is positioned such that its optical axis of observation (Y) is substantially tangent to the left or right edge of the finish.

7. The method according to claim 1, according to which there is a camera (4) provided with a telecentric lens.

8. The method according to claim 1, according to which there is a light source (3) having vertical and horizontal illumination dimensions comprised between 100% and 200% and preferably 120% of the dimensions of the field of view of the camera (4) multiplied by the distance between the light source and the lens (4a) of the camera and divided by the distance between the axis of the containers and the lens of the camera.

9. The method according to claim 1, according to which there is a telecentric light source whose illuminated field has dimensions greater than or equal to the dimensions of the field of view of the camera.

10. The method according to claim 1, according to which the profiles (P) of the finish edge of the images are compared with a reference profile (Pf) of the finish edge, by using as a reference profile (Pf), at least one profile obtained on at least one reference container considered to be compliant, so as to detect deviations.

11. The method according to claim 1, according to which the profiles (P) of the finish edge of the images are compared with a reference profile (Pf) of the finish edge, by using as reference profile (Pf) an average profile calculated over several increments of rotation of at least one reference container considered to be compliant, so as to detect deviations.

12. The method according to claim 1, according to which the profiles (P) of the finish edge of the images are compared with a reference profile (Pf) of the finish edge, by using as a reference profile (Pf) a profile of the finish edge to which a low-pass filter is applied, so as to detect deviations.

13. The method according to claim 1, according to which the profiles (P) of the finish edge of the images are compared with a reference profile (Pf) of the finish edge, by applying a high-pass filter on the profiles of the finish edge, so as to detect deviations.

14. The method according to claim 1, according to which, for each image, the profile (P) of the finish edge and the reference profile (Pf) of the finish edge are compared for at least several altitudes in the inspection zone (ZI), by comparing at least one area, amplitude and/or slope measurement with a threshold and a deviation is detected when at least one of these measurements exceeds this threshold.

15. The method according to claim 1, according to which the method consists in detecting at least one horizontal mold seal (JH) defect taken from among the following defects: knock out (JHK), flange (JHF) and overhang/overmatch (JHO).

16. The method according to claim 1, according to which at least one detection criterion is defined for each following defect, namely knock out (JHK), flange (JHF) and overhang/overmatch (JHO), and to which the method consists in discriminating the defects detected among these three defects by using at least one of these detection criteria.

17. The method according to claim 16, according to which the shape of the deviations detected for several altitudes in the inspection zone is chosen as a detection criterion, for at least one image.

18. The method according to claim 16, according to which the angular extent of observation of the deviations corresponding to the number of successive images in which a deviation is detected is chosen as a detection criterion.

19. The method according to claim 17, according to which the shape of the deviations detected for several altitudes in the inspection zone is analyzed in order to discriminate the overhang/overmatch (JHO) defect relative to the knock out (JHK) and flange (JHF) defects.

20. The method according to claim 16, according to which the angular extent of observation of the deviations is analyzed to discriminate the knock out (JHK) defect relative to the flange (JHF) defect, by considering that a knock out defect is detected when the angular extent of observation of the deviations is below a fixed maximum limit.

21. The method according to claim 16, according to which the angular extent of observation of the deviations is analyzed to discriminate the knock out (JHK) defect relative to the flange (JHF) defect, by considering that a flange defect is detected when the angular extent of observation of the deviations is above a fixed minimum limit.

22. The method according to claim 1, according to which for each container with a horizontal mold seal defect, a signal is sent to eject the container from a production line.

23. The method according to claim 1, according to which the container (R) is rotated on itself along the vertical axis (Z) according to at least one rotational revolution for a maximum duration of 200 ms.

24. An inspection device implementing a method in accordance with claim 1, for detecting, on the glass container finish, defects in the horizontal mold seal (JH).

\* \* \* \* \*